United States Patent [19]

Hazenbroek

[11] Patent Number: 5,019,013
[45] Date of Patent: May 28, 1991

[54] ON LINE BREAST HALVER AND PROCESSOR

[76] Inventor: Jacobus E. Hazenbroek, Burg de Zeeuwstraat 52, Numansdorp, Netherlands

[21] Appl. No.: 472,891

[22] Filed: Jan. 31, 1990

[51] Int. Cl.$^5$ .............................................. A22C 21/00
[52] U.S. Cl. .................................... 452/151; 452/155; 452/167
[58] Field of Search ............... 17/11, 52, 45; 452/149, 452/151, 155, 167

[56] References Cited

U.S. PATENT DOCUMENTS

| 4,270,243 | 6/1981 | Lewis | 17/11 |
| 4,439,891 | 4/1984 | van Mi | 17/11 |
| 4,815,168 | 3/1989 | Van der Nieuwelaar et al. | 17/11 |

FOREIGN PATENT DOCUMENTS

| 2129278 | 5/1984 | United Kingdom | 17/11 |

Primary Examiner—Willis Little
Attorney, Agent, or Firm—Thomas, Kerr & Kayden

[57] ABSTRACT

The present invention comprises a method and apparatus for automatically halving and processing the breasts and backs of poultry carcasses while the carcasses are still moving along a poultry processing line. The carcasses are passed along the processing line through a V-shaped separator blade 26 which separates the saddle portion of the carcass from the breast and back of the carcass. The breast and back of the carcass are then pulled along the length of an internal guide rail 32 by a pair of chain conveyors 33 for processing. A large rotary halving blade 43 positioned below the internal guide rail 32 is movable upward to initially cut only the breast of the carcass and further upward to separate the entire carcass in half. A pair of back removal blades 46 positioned above the internal guide rail 32 following the rotary halving blade 43 can be lowered to remove the backbone from the carcass if the halving blade 43 is not fully raised to separate the entire poultry carcass.

19 Claims, 4 Drawing Sheets

ON LINE BREAST HALVER AND PROCESSOR

FIELD OF THE INVENTION

The present invention relates in general to a method and apparatus for automatically cutting apart the breast and upper back, or upper carcass portion, from the back and legs known as the "saddle" or lower carcass portion of a poultry carcass as previously eviscerated birds are suspended by their legs and moved in series along an overhead conveying system. More particularly, the invention relates to a method and apparatus for using the thighs of each bird to properly locate the bird at the correct height at the cutting blades, by partially supporting the thighs of the bird on a surface as the bird moves with the overhead conveyor along the processing path, and cutting apart the breast and upper back portion from the saddle of the bird and removing or cutting through the backbone in the upper carcass as the series of the carcasses move along a poultry processing line.

BACKGROUND OF THE INVENTION

When chickens, turkeys or other poultry are to be processed through a poultry processing plant for defeathering, evisceration, cut up and for packaging and delivery to the retail grocery store, etc., it is highly desirable to perform as many of the processing steps with automated machinery and with a minimum of manual labor, so as to minimize the expense of the process and to uniformly cut apart the birds.

In recent years, the birds have been suspended by their legs from an overhead conveying system and many of the processing steps have been performed on the birds as they move in series on the conveying system. For example, the birds can be defeathered, decapitated, opened, and eviscerated while being advanced progressively through a poultry processing plant on an overhead conveying system. It is further desired that the birds be segmented while continuing their travel on the overhead conveying system, so as to avoid manual handling of the birds. However, it is still common practice to remove the poultry carcasses from the overhead conveying system in order to cut apart the birds.

Recently, there have been a few efforts to form preliminary cuts in poultry carcasses while the carcasses still remain suspended by their legs on an overhead conveyor system. For example, U.S. Pat. No. 4,574,429 discloses a poultry halving method and apparatus whereby the birds remain suspended by their legs on an overhead conveyor system as the birds are cut between the forward or breast portion of the bird and the rear or saddle portion of the bird. However, the forward, breast portion of the bird is permitted to fall uncontrolled to a receptacle or conveyor for further manual handling.

It can therefore be seen that it is desirable to provide a method and apparatus which performs the functions of cutting apart the previously eviscerated poultry carcasses as the carcasses move in series along an overhead conveyor system, and as the carcasses are cut apart, the pieces removed from the overhead conveyor system are received and automatically processed by the equipment so as to avoid further manual handling of the carcass parts.

SUMMARY OF THE INVENTION

Briefly described, the present invention comprises a method and apparatus for automatically separating the forward breast and upper back portion from the rearward saddle portion of poultry carcasses as the carcasses are moved in suspended series along an overhead conveying system, hanging downwardly from the processing line with their legs in shackles on the processing line. The apparatus is positioned along the overhead conveyor line and the apparatus can be raised and lowered into correct position for receiving the poultry carcasses carried by the overhead conveyor.

Preferably, the carcasses will have been moved on the conveyor system through a previous cutting station, similar to the apparatus described in U.S. Pat. No. 4,574,429, so that the skin and tissue joining the tail to the breast and extending at the sides of the visceral cavity will have been cut to partially separate the saddle from the breast.

As the undivided poultry carcasses move in series along the processing line, each carcass passes between the cutting surfaces of a horizontally oriented V-shaped separator blade, moving into contact with these cutting surfaces, with the visceral cavity straddling the plane of the blade to position the upper carcass below the blade and the lower carcass or saddle portion above the blade. Each carcass is pulled by its legs between the cutting surfaces of the blade with the saddle (the lower back, legs and thighs) of the carcass positioned above the separator blade and the breast and upper back positioned below the blade. The thighs of each bird engage the upper surface of each side portion of the V-shaped separator blade and properly suspend the upper carcass below the blade and maintain the saddle above the blade as the portion of the backbone extending between the upper and lower carcass portions moves into engagement with the converging sharpened cutting edges of the V-shaped separator blade until the blade cuts through the backbone and separates the upper and lower carcass portions.

The saddle which is now separated from the upper carcass continues its movement along the overhead conveyor system to subsequent processing steps while the upper carcass is guided toward and surrounds an internal guide rail which extends through the visceral cavity of the carcass. The upper back of the upper carcass becomes positioned on top of the internal guide rail with the breast hanging below the guide rail with the guide rail extending into the tail opening of the carcass, through the carcass and out the neck opening of the carcass.

The carcass is pulled along the length of the internal guide rail by a pair of conveyor chains positioned on opposite sides of the internal guide rail. The conveyor chains engage the sides of the breast to pull the breast forward along the internal guide rail for processing.

A large rotary halving blade is positioned directly below the internal guide rail adjacent one end of a lower guide rail. The halving blade is movable between raised and lowered positions. In its lowered position, the halving blade is kept out of engagement with the carcass and the breasts pass through the apparatus without becoming halved. When raised to an intermediate position, the halving blade cuts longitudinally through the breasts so as to split the breasts. When placed in its fully raised position, the halving blade cuts longitudinally through both the breast and the back bone of the upper back, as the breast and upper back move along the internal guide rail.

When the backbone is to be removed from the upper back portion of the carcass, a pair of rotary back removal blades are tilted downwardly into their cutting positions at the discharge end of the internal guide rail, straddling the path of the backbone of the carcass. The removal blades cut into the upper back of the carcasses on both sides of the backbone to separate the backbone from the breast and back of the carcass.

Under the discharge end of the internal guide rail, following the rotary halving blade and the back removal blades, is a wedge-shaped clearing plate. The clearing plate has a downwardly sloping front edge which forces an uncut breast down, pulling it away from the backbone. If the breast has been cut in half, or the whole carcass has been cut in half, the clearing plate ensures the skin of the breast is pulled apart and that the breast halves are completely separated as the halves fall from the apparatus.

Thus, an object of this invention is to provide for the automatic processing of the breast and upper back portions of poultry carcasses as they are being transported along a processing line suspended by their legs from the processing line.

Another object of this invention is to increase the rate at which the breast and upper back portions of poultry carcasses can be processed without decreasing the processing rate of the entire processing line.

Another object of the invention is to provide a method and apparatus for reliably and accurately segmenting poultry carcasses which are received on an overhead conveying system, with the saddle portion continuing with the conveyor line and the upper carcass being divided.

Other objects, features and advantages of the present invention will become apparent upon reading the following specification, when taken with conjunction with the accompanying drawings.

DETAILED DESCRIPTION

Figure 1:
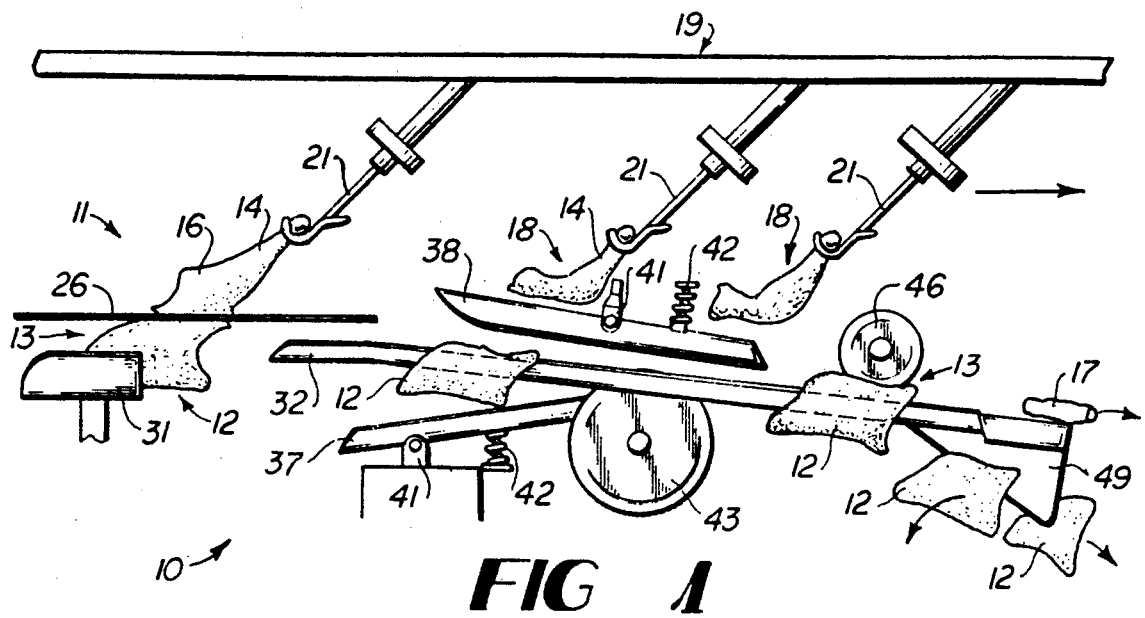
FIG. 1 is a schematic representation of the breast halving and processing apparatus and the process by which the breast is split in half and the backbone removed from the carcass.

Referring now in more detail to the drawings in which like numerals indicate like parts throughout the several views, FIG. 1 schematically illustrates the process performed by the disclosed breast halving and processing apparatus 10 wherein a series of previously eviscerated whole carcasses 11 of chickens or other birds are transported by a overhead conveyor system 19 hanging by their legs 14 from shackles 21. Each carcass comprises a breast 12 and upper back 13 which comprise the upper carcass portion, a backbone 17, and a lower back 15, thighs 16 and legs 14 which comprise the lower carcass portion or saddle. Each whole carcass 11 hangs from the overhead conveyor system 19 with the opening in the neck portion of the carcass 11 facing downwardly, the breast portion 12 of the carcass 11 facing forward and the upper back 13 of the carcass 11 facing to the rear. If the halving operation is to be performed by the apparatus, the wings of the carcass 11 typically will have been removed from the carcass 11 prior to the introduction of the carcass 11 into the breast halving and processing apparatus 10. If only the backbone 17 is to be removed from the carcass 11, the wings can be left on the carcass 11 for processing.

The carcass is initially passed through a pre-cutter (not shown) of a type generally disclosed in U.S. Pat. No. 4,574,429, where an initial cut is made between the breast 12 and the thighs 16 of the carcass 11 through the skin and tissue at the sides of the visceral cavity so as to let the breast 12 hang further from the saddle 18 to enlarge the opening between the breast 12 and the saddle 18 to allow a clean separation of the breast 12 and upper back 13 from the saddle 18 of the carcass 11, no matter what size carcass 11 is being processed.

After passing through the pre-cutter, the carcass 11 proceeds along the overhead conveyor system 19 toward the breast halving and processing apparatus 10. The whole carcass 11 hanging from a shackle 21 passes through a stationary V-shaped separator blade 26 which separates the breast 12 and upper back 13 from the legs 14 and thighs 16, the saddle 18 portion of the carcass 11. As the birds each pass through the V-shaped separator blade 26, the thighs 16 of each bird engage the upper surfaces of the side portions of the V-shaped separator blade 26 and become partially supported by the V-shaped separator blade 26. This causes the bird to be supported with its upper carcass suspended below the V-shaped separator blade 26 and its lower carcass positioned above the V-shaped separator blade 26. Also, the breast 12 tilts in response to the thighs engaging and sliding along the upper surfaces of the V-shaped separator blade 26, causing the visceral opening to face more directly toward the direction of movement of the bird. As the overhead conveyor 19 continues to move the bird, the portion of the backbone 17 that joins the lower and upper carcass portions approaches the narrowing sharp edges of the V-shaped separator blade 26 and becomes separated by the blade. As the legs 14 are pulled by the shackles 21 and the backbone 17 moves into engagement with and is cut by the V-shaped separator blade, the breast 12 and upper back 13 of the carcass 11 are tilted causing the visceral cavity of the carcass 11 to become aligned with a longitudinal internal guide rail 32. The breast 12 and upper back 13 are positioned on the internal guide rail 32 by an upper guide rail 38 guiding the backbone 17 of the carcass 11 onto the top of the internal guide rail 32 and a lower guide rail 37 forcing the breast 12 upward into contact with the bottom of the internal guide rail 32. A rotary halving blade 43 positioned below the internal guide rail 32 cuts the breast 12 in half, and a pair of rotary back removal blades 46 engage the upper back 13 of the carcass 11 to remove the backbone 17 from the carcass 11.

Figures 2A, 2B:
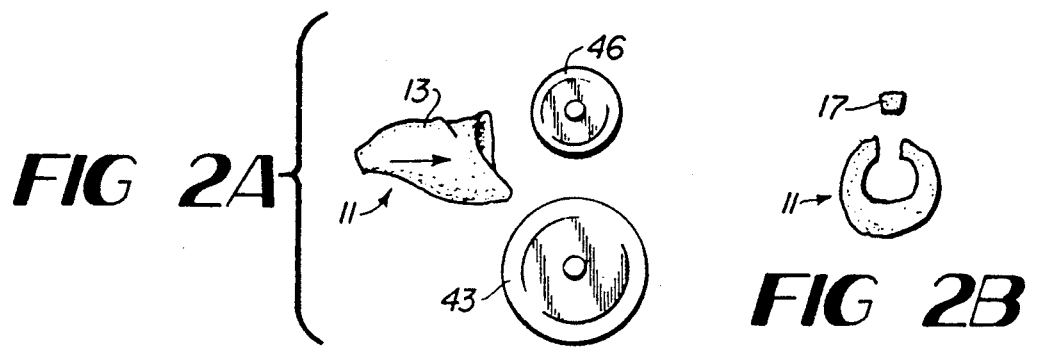
FIGS. 2A, 3A and 4A are schematic side illustrations of the upper poultry carcass and the cutting blades, showing the positions of the cutting blades as the upper carcass moves through the blades.
FIGS. 2B, 3B and 4B are schematic end illustrations of the upper carcass showing the cuts made when the blades are positioned as shown in FIGS. 2A, 3A and 4A, respectively.
Figures 3A, 3B:
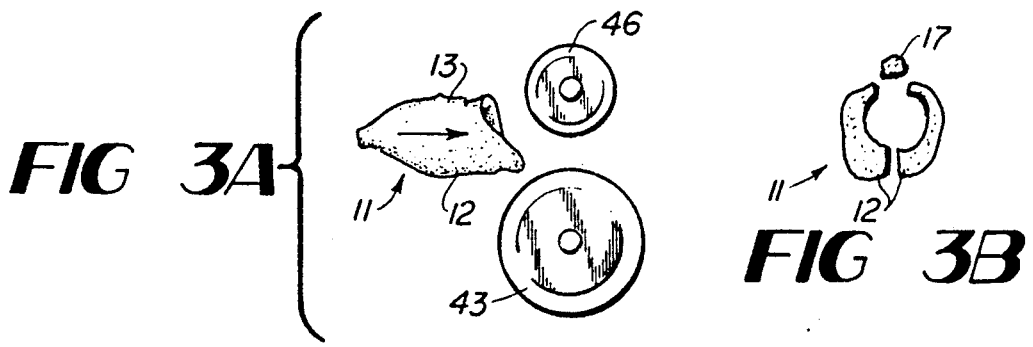

FIGS. 2A–4B schematically illustrate the various cutting positions of the rotary halving blade 43, lowered out of engagement with the carcass 11 (FIG. 2A), raised to an intermediate cutting position for cutting only the breast 14 of the carcass 11 in half (FIG. 3A) or raised to a fully raised cutting position to split the entire carcass 11 in half (FIG. 4A), and the cutting positions of the back removal blades 46 which are lowered from an inoperative position out of engagement with the upper back 13 of the carcass 11 to an operative cutting position for cutting the backbone 17 from the upper back 3 of the carcass 11 (FIGS. 2A and 3A).

FIG. 2A shows the back removal blades 46 lowered into their operative cutting position above the carcass 11 and the rotary halving blade 43 in its inoperative position lowered out of engagement with the carcass 11. The back removal blades 46 engage the upper back 13 of the carcass 11 straddling the backbone 17 to remove the backbone 17 from the remainder of the carcass 11 which remains uncut as shown in FIG. 2B.

FIG. 3A shows the back removal blades 46 in their operative position for engaging the upper back 13 of the carcass 11 with the rotary halving blade 43 raised to its intermediate cutting position for engaging only the breast 12 of the carcass 11. The rotary halving blade 43 engages the breast 12 of the carcass 11 to split the breast 12 in half and the removal blades 46 engage the upper back 13 to remove the backbone 17 (FIG. 3B) from the upper back 13. Thus, the breast 12 and upper back 13 are separated into halves with the backbone 17 completely removed from the halved sections.

Figures 4A, 4B:
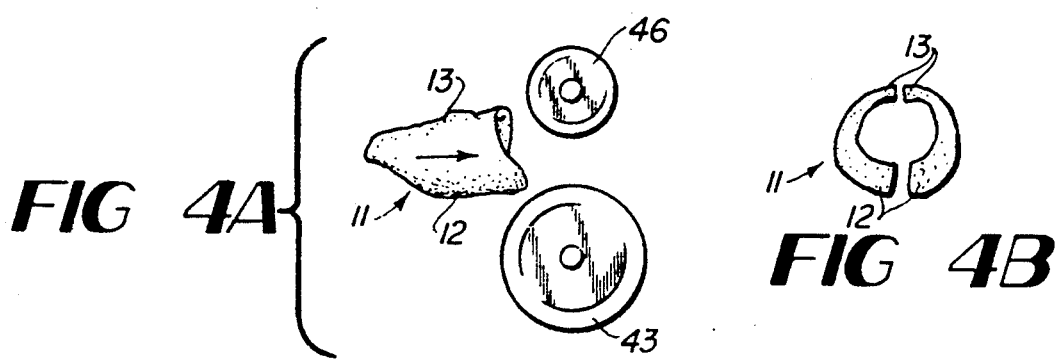

As illustrated in FIG. 4A, the back removal blades 46 are raised to an inoperative position above the carcass 11 out of engagement with the upper back 13 of the carcass 11 when the rotary halving blade 43 is raised to its fully raised cutting position for separating the entire carcass 11. The rotary halving blade 43, in its fully raised cutting position, cuts completely through the breast 12, upper back 13 and backbone 17 of the carcass 11. As shown in FIG. 4B, the entire carcass 11 is thus separated into the distinct halves with the split sections of the backbone 17 remaining with the halves of the breast 12 and upper back 13 of the carcass 11.

Figure 5:
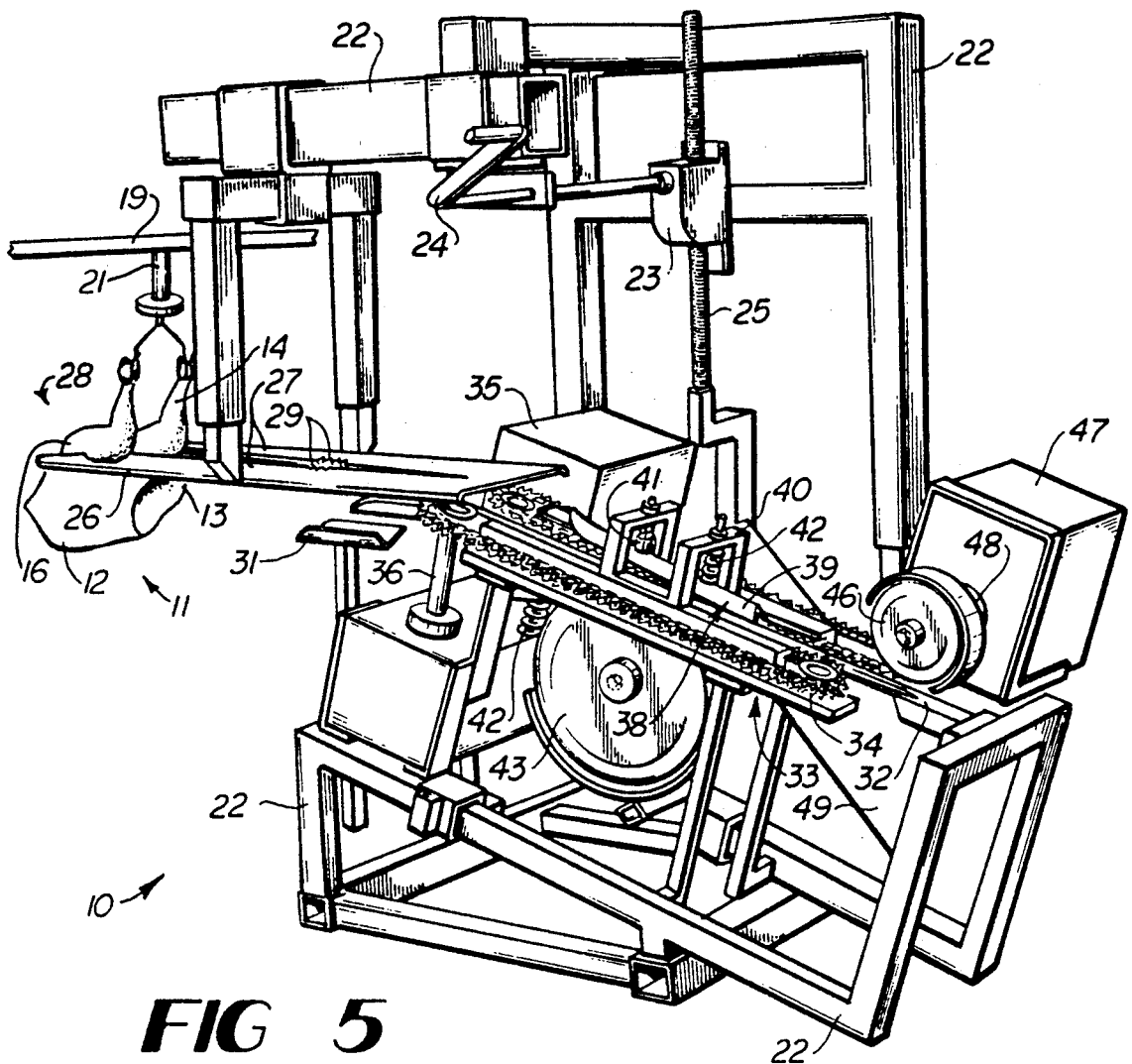
FIG. 5 is a perspective illustration of the breast halving and processing apparatus embodying the principles of the present invention.

The breast halving and processing apparatus 10 is shown in more detail in FIG. 5. The breast halving and processing apparatus 10 is hung from a support in a poultry processing plant above the overhead conveying system 19 and is adjusted up or down to position the halving and processing apparatus 10 in relation to the carcasses 11 moving along the overhead conveying system 19. The entire apparatus frame 22 is raised and lowered by an apparatus hoist 23 which includes a crank 24 at the top of the apparatus frame 22 which is rotatable to raise and lower the apparatus frame 22 to the proper height for processing. As the crank 24 is turned, the hoist 23 engages the teeth of an elongated hoist bar 25 to pull the entire apparatus frame 22 upwards or to allow the frame 22 to be carefully lowered with respect to the carcasses 11 on the overhead conveying system 19 into position to receive the carcasses 11 for processing.

As a carcass 11 enters the apparatus, it enters a V-shaped separator blade 26 and is guided between the opposing cutting surfaces 27 of the V-shaped separator blade 26 at the beginning of the apparatus 10. The cutting edges 27 of the V-shaped separator blade 26 narrow progressively toward each other from an open receiving position spread apart from one another, to a closed separating position forming a V-shaped slot 28 therebetween. As the carcass 11 proceeds along between the narrowing cutting edges 27, the thighs 16 (FIG. 5A) engage the upper surfaces of the side portions of the V-shaped separator blade 26 with the thighs 16 initially sliding on the upper surfaces of the V-shaped blade 26 pulling the breast 12 and upper back 13 so as to properly suspend the breast 12 below the cutting edges of the V-shaped separator blade 26. The sides of the carcass 11, at opposite sides of the portion of the backbone 17 which joins the upper carcass to the saddle 18 engage the cutting edges 27 so that the cutting edges 27 of the V-shaped separator blade 26 contact the carcass 11 at the between the breast 12 and the thighs 16 of the carcass 11. The guiding of the carcass 11 by engagement of the thighs 16 with the upper surface of the V-shaped separator blade 26 causes the cutting edges 27 of the V-shaped separator blade 26 to engage the carcass 11 at the initial cut made by the precut machine (not shown). Positioned at a mid-point along the length of each of the cutting edges 27 is a saw portion 29 which cuts through the skin on the sides of the carcass 11 or between the breast 12 and thighs 16 as the carcass 11 is pulled along the cutting edges 27 of the V-shaped separator blade 26. The cutting surfaces 27 sever the breast 12 and upper back 13 of the carcass 11 from the saddle 18 of the carcass 11 as the carcass is progressively pulled along the narrowing slot 28.

Figure 5A:
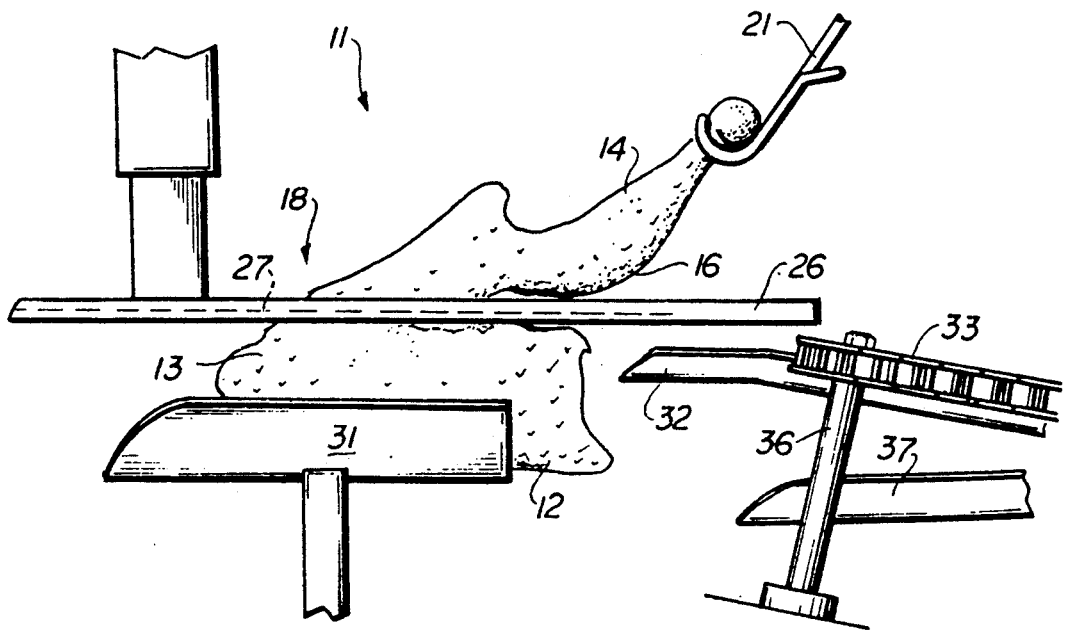
FIG. 5A is a side elevational view of the separation of the saddle portion of the poultry carcass from the breast and back of the carcass by the separator blade.

As shown in FIG. 5A, during the separation process the saddle 18 is above the cutting surfaces 27 of the V-shaped separator blade 26, with the thighs 16 of the carcass 11 initially lying flat on the top surface of the blade 26 to support the carcass 11 and the legs 14 of the carcass 11 held within a shackle 21 on the overhead conveying system 19. The breast 12 and back 13 of the carcass 11 trail behind the saddle 18 passing below the surface of the V-shaped separator blade 26. As the thighs 16 are pulled into closer contact with the upper surface of the V-shaped separator blade 26, the trailing breast 12 and upper back 13 are tilted upwardly and rearwardly so that the visceral cavity tilts forwardly when the carcass 11 is hanging from the overhead conveying line to a horizontal position aligned with the foremost portion of the internal guide rail 32 facing the direction of movement of the carcass 11. Trailing the thighs 16 along the upper surface of the V-shaped separator blade 26 to partially support the saddle 18 on the surface of the V-shaped separator blade 26 additionally ensures the breast 12 and upper back 13 will be correctly positioned below the V-shaped separator blade 26 no matter what size carcass is being processed. The thighs 16 of the carcass 11 therefore function as a locator to automatically tilt the carcass 11 forward to align the initial cut made by the precutter adjacent the visceral cavity with the cutting surfaces 27 of the V-shaped separator blade 26.

The breast 12 and upper back 13 of the carcass 11 are further supported below the V-shaped separator blade 26 during the separation from the saddle 18 of the carcass 11 by a U-shaped channel member 31 positioned directly below the V-shaped separator blade 26. Thus, a clean separation of the saddle 18 from the breast 12 and upper back 13 of the carcass 11 is achieved for carcasses 11 of varied sizes without requiring an adjustment to the V-shaped separator blade 26 to accommodate each different sized carcass 11.

Figure 6:
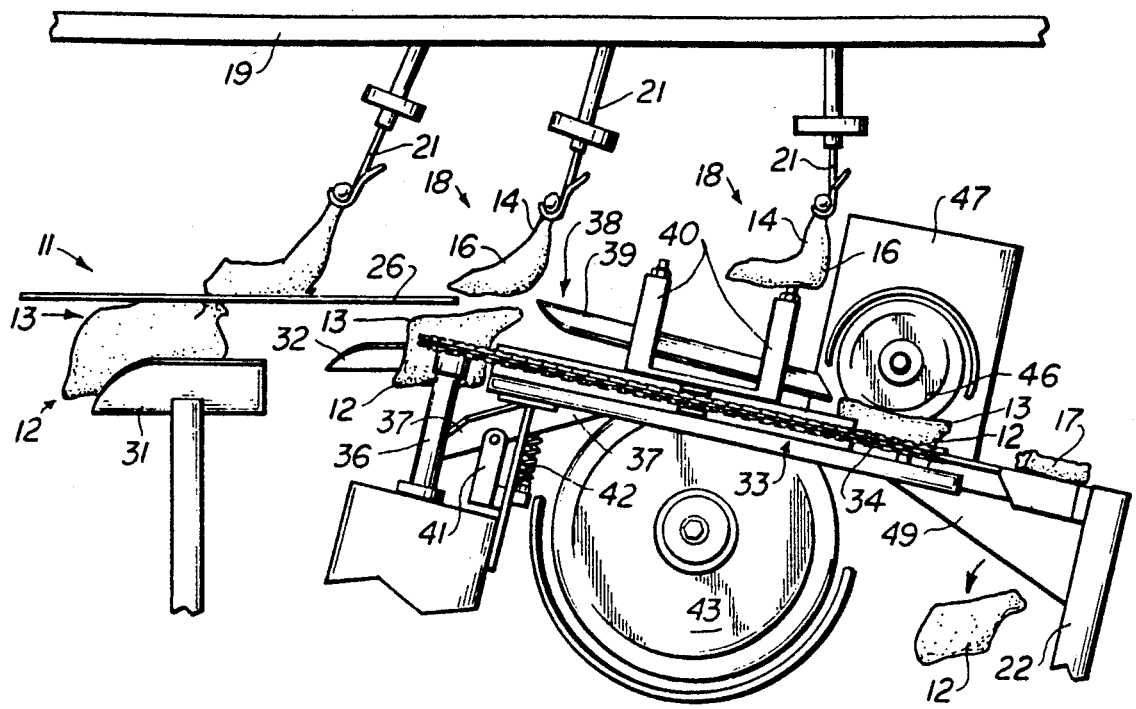
FIG. 6 is a side elevational view of the breast halving and processing apparatus in operation to cut the breast of poultry carcasses in half and remove the backbone from the carcass.
Figure 7:
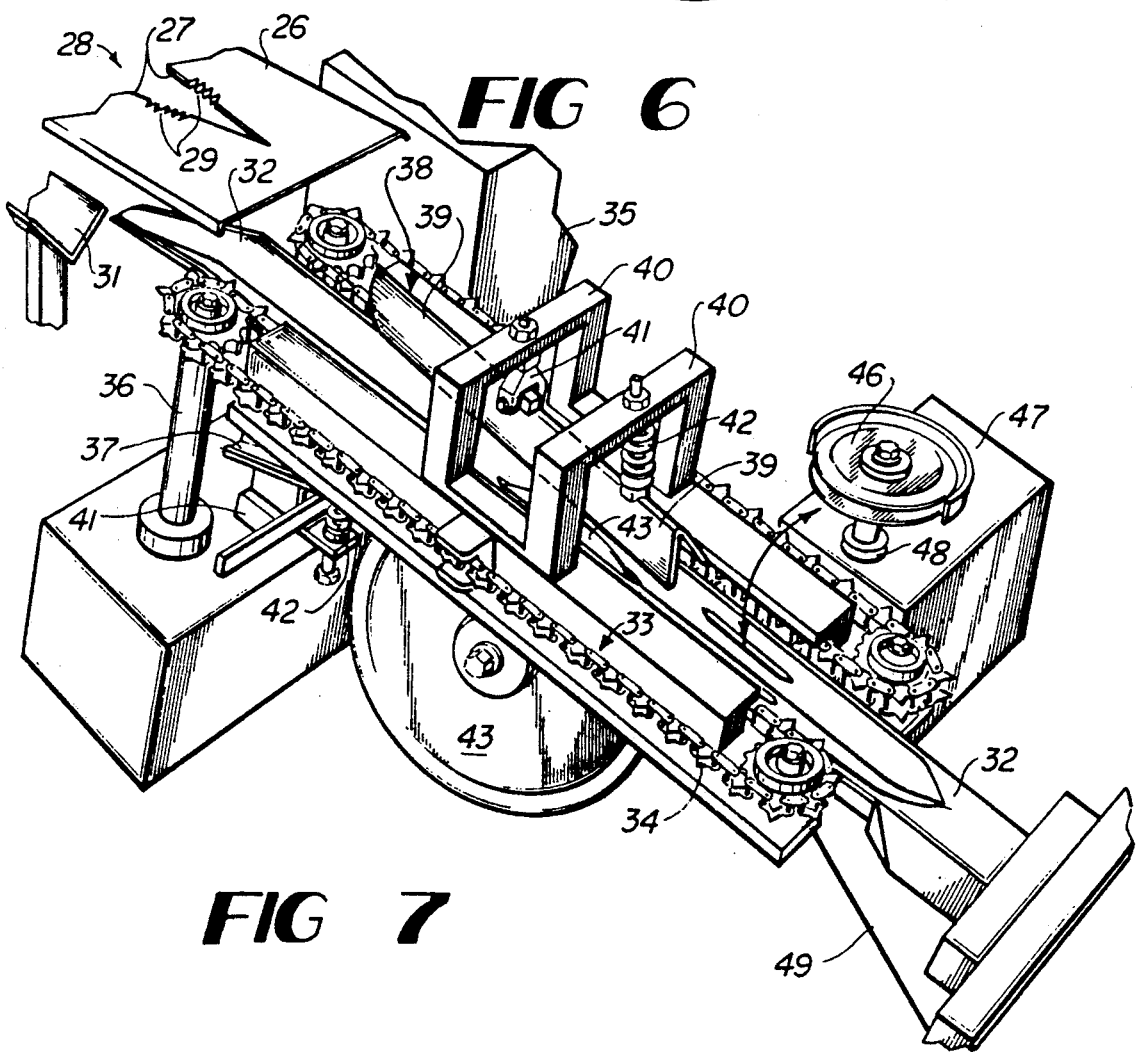
FIG. 7 is a perspective illustration of the internal guide between the conveyor chains with the upper guide rail above the internal guide rail.
Figure 8:
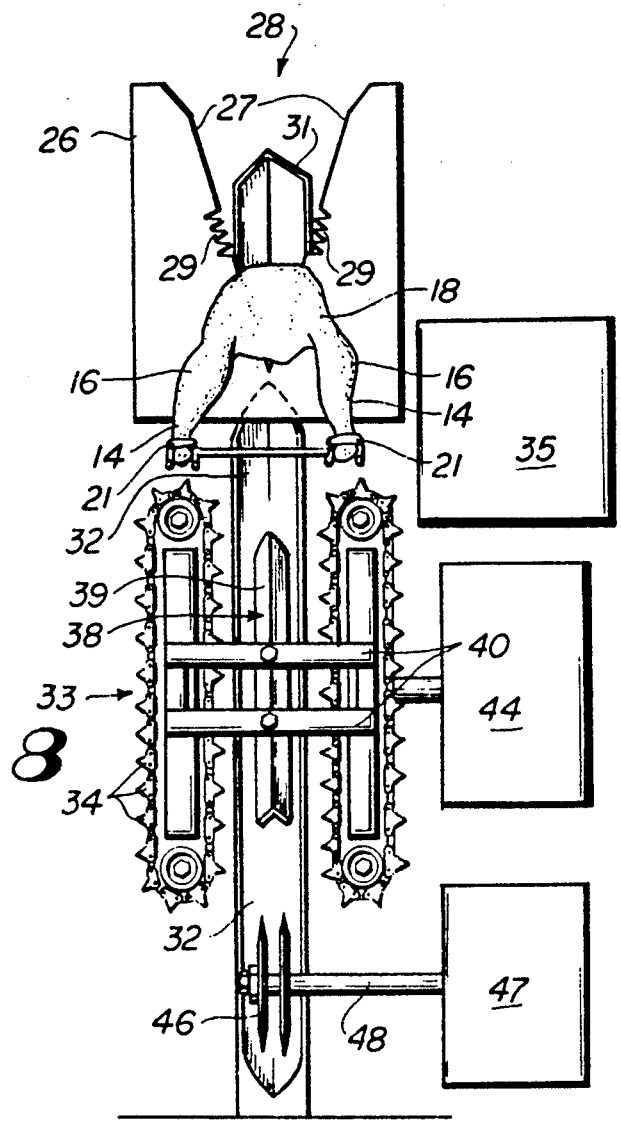
FIG. 8 is a plan view of the V-shaped separator blade and the internal guide rail with the conveyor chains on both sides of the internal guide rail.

As shown in FIGS. 6 and 7 the visceral cavity of the carcass 11, is aligned by the tilting of the breast 12 and upper back 13 due to the dragging of the thighs 16 of the carcass 11 along the top surface of the V-shaped separator blade 26 and the U-shaped channel member 31, which also supports the breast 12 and upper back 13, for alignment on the foremost end of the arched, elongated internal guide rail 32 facing the direction of movement of the carcass 11. The carcass 11 is moved onto the internal guide rail 32 extending into the tail opening of the carcass 11 through the visceral cavity and out the neck opening of the carcass 11 with the upper back 13 of the carcass 11 resting on top of the internal guide rail 32 and the breast 12 hanging below the lower surface of the internal guide rail 32. As the carcass 11 proceeds onto the internal guide rail 32, the sides of the carcass 11 are engaged by a pair of chain conveyors 33 (FIG. 8). These chain conveyors 33 are positioned immediately adjacent the internal guide rail 32 on opposite sides of the internal guide rail 32 and include a plurality of wedge shaped teeth 34 which engage the meat on the sides of the carcass 11 to pull the carcass 11 along the length of the internal guide rail 32. A motor 35 controls the movement of the pair of chain conveyors 33. The motor 35 is positioned adjacent to one side of the apparatus 10 at the foremost end of the internal guide rail 32 facing the direction of movement of the carcasses 11 and rotates a pair of drive shafts 36 (FIG. 6) at the foremost end of the internal guide rail 32. The rotation of the drive shafts 36 moves the chain conveyors 33 along the length of the internal guide rail 32.

Figure 9:
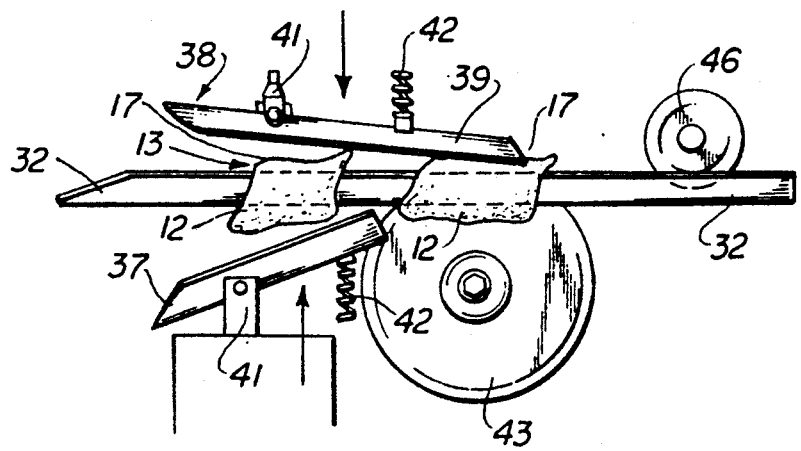
FIG. 9 is a schematic representation of the upper and lower guide rails contacting the breast and back of poultry carcass to position the carcass on the internal guide rail.

As the chain conveyors 33 pull the carcass 11 along the internal guide rail 32, the carcass 11 is engaged above and below the internal guide rail 32 by a pair of guide rails 37 and 38. As shown in FIGS. 6 and 9, the V-shaped lower guide rail 37 extends upwardly at an angle from a position in front of and below the input end of the internal guide rail 32 to a position immediately below the lower surface of the internal guide rail 32, and functions as a lower positioning means for properly positioning the breast 12 of the carcass 11. This lower guide rail 37 initially urges the carcass 11 onto the internal guide rail 32 and further engages the breast 12 of the carcass 11 below the internal guide rail 32 forcing the breast 12 upward against the lower surfaces of the internal guide rail 32 to flatten out the carcass 11 so that the inner surface of the breast 12 along the visceral cavity is urged against the internal guide rail 32 for more precise control of the carcass 11 and more accurate cutting of the breast 12. The upper guide rail 38 (FIGS. 7 and 9) has an inverted V-shaped configuration and contacts the upper back 13 about the backbone 17 of the carcass 11 above the internal guide rail 32, and functions as an upper positioning means to press the upper back 13 of the carcass 11 downwardly so that the backbone 17 tends to ride in the cavity of the V-shaped internal guide rail 32, thereby properly positioning the carcass 11 for cutting. The upper guide rail 38 is mounted approximately parallel to and above the internal V-shaped guide rail 32, extending partially along the length of the internal guide rail 32, by a pair of mounting supports 40. The mounting supports 40 straddle the internal guide rail 32 extending over and above the top surface of the internal guide rail 32. The upper guide rail 38 is pivotally supported by mounting supports 40 and held by the supports 40 above the internal guide rail 32. The backbone 17 of the carcass 11 is aligned in the center of the arched portion 39 of the upper guide rail 38. The upper guide rail 38 urges the backbone 17 downward into proper processing position in which the backbone 17 rides in the V-shaped cavity of the internal guide rail 32. Each of the lower and upper guide rails 37 and 38 is rotatably attached to the apparatus in a spaced relation from the internal guide rail 32 by a hinge 41. This hinge 41 acts as a pivot point and allows each guide rail 37 and 38 to tilt vertically toward and away from the carcass 11 on the internal guide rail 32 to accomodate larger or smaller carcasses 11.

A spring 42 is affixed to each guide rail 37 and 38 at a position following the hinge 41 on each guide rail 37 and 38 and functions as a compression means for forcing the guide rails 37 and 38 into contact with the carcass 11 as the carcass 11 is pulled along the internal guide rail 32 by the chain conveyors 33. FIGS. 1 and 9 schematically illustrate the compression force applied by each guide rail 37 and 38 to align the upper back 13, backbone 17 and breast 12 of the carcass 11 in proper position on the internal guide rail 32 for the halving and processing operations.

After the guide rails 37 and 38 (FIG. 5) have positioned the carcass 11 on the internal guide rail 32, a large rotary halving blade 43, driven by motor 44 arranged on one side of the apparatus 10 adjacent to the internal guide rail 32, can be raised from an initial resting position out of engagement with the carcass 11 directly below the internal guide rail 32 upward into an intermediate cutting position. The rotary halving blade 43 is positioned below the internal guide rail 32 in line with the center of the upper guide rail 38 and immediately adjacent the end of the lower guide rail 37. The rotary halving blade 43 is initially positioned out of contact with the carcass 11 in its resting position below the internal guide rail 32. In its intermediate cutting position, the rotary halving blade 43 (FIGS. 3A and 6) is raised to a position adjacent the lower surface of the internal guide rail 32. The rotary halving blade 43 engages only the breast 12 as the breast 12 is pulled along the internal guide rail 32 into contact with the halving blade 43, severing the breast 12 in half.

The rotary halving blade 43 (FIGS. 4A and 7) can be further raised to a final fully raised cutting position extending through a slot in the center of the internal guide rail 32. In this fully raised cutting position, the rotary halving blade 43 cuts through the breast 12, upper back 13 and backbone 17 of the carcass 11 to completely separate the whole carcass 11 in half.

A pair of rotary back removal blades 46 are arranged at a position after the point of engagement of the carcass 11 by the rotary halving blade 43 and above the internal guide rail 32 and adjacent the end of the upper guide rail 38. These back removal blades 46 are driven by a drive motor 47 connected to the blades 46 by a drive shaft 48. The motor 47 and the blades 46 are tiltable toward and away from the internal guide rail 32. When the rotary halving blade 43 is in its fully raised cutting position extending through the internal guide rail 32 to sever the entire carcass 11 in half, the back removal blades 46 are tilted up and away from the internal guide rail 32, into an inoperative position out of engagement with the carcass 11. When the halving blade 43 is lowered to its intermediate position for halving only the breast 12 of the carcass 11, or when completely lowered to its resting position out of engagement with the carcass 11 as when no halving operation is to be performed, the back removal blades 46 are tilted downwardly toward the internal guide rail 32 (FIGS. 5 and 6) into their fully operative cutting position. In this cutting position, the back removal blades 46 straddle the backbone 17 of the carcass 11. The removal blades 46 engages the upper back 13 of the carcass 11 on opposite sides of the backbone 17 to cut the backbone 17 out of the carcass 11 for removal of the backbone 17.

At the end of the cutting process the halves of the cut-up upper carcass 11 are pushed by the conveyors 33 toward the discharge end of the internal guide rail 32 where the separated sections fall away through the bottom of the apparatus onto a collection conveyor (not shown) and the backbone 17 slides off the end of the internal guide rail 32 into a removal bin (not shown). Mounted to the lower surface of the internal guide rail 32 at the discharge end of the internal guide rail 32 is a triangular shaped clearing plate 49. The clearing plate 49 is contacted by the carcass 11 with the severed halves of the upper back 13 being separated by the clearing plate 49. If no breast cut has been made by the halving blade 43, the clearing plate 49 tends to force the breast 12 downwardly away from the internal guide rail 32 and the backbone 17 to complete the separation of the backbone 17 from the breast 12 wherein the backbone 17 is pushed off the end of the internal guide rail 32 for removal separate from the breast 12 and upper back 13 of the carcass 11. If a breast cut has been made by the halving blade 43 or the entire carcass 11 has been split in half, the clearing plate 49 ensures the sections of the breast 12 are fully separated and guides the sections of the breast 12 apart and also ensures that the skin on the breast 12 is pulled apart to keep the breast sections separate.

The breast halving and processing apparatus can accommodate any number of carcasses which might be carried by any known processing line. Consequently, it is seen that a method and apparatus is now provided for the on-line processing and halving of the breast portions and upper back portions of poultry carcasses which allows a significant increase in the processing rate of these carcasses. The breast and upper back portions of the carcass are automatically separated from the saddle of the carcass while the carcasses are still carried by a poultry processing line and cut into sections without necessitating the removal of the carcasses from the line and transport to a separate processing machine.

While this invention has been described in detail, it should be understood that the described embodiment merely illustrates the preferred form of the invention and numerous variations or modifications may be made thereto without departing from the spirit and scope of the invention as set forth in the following claims.

What is claimed is:

1. A method for the on-line processing of the breast and back portions of a poultry carcass or the like, comprising the steps of:

suspending a plurality of previously eviscerated poultry carcasses with the legs of each carcass hanging from an overhead conveyor and with the visceral opening of the carcass facing upwardly and the neck opening of the carcass facing downwardly;

moving the carcass with the conveyor in series along a processing path;

as each carcass moves along the processing path separating the upper carcass portion from the lower carcass portion of the poultry carcass by engaging the carcass with the narrowing side cutting edges of a V-shaped blade between the thighs and back of the carcass, pulling the carcass between the cutting edges of the blade with thigh portions of the lower carcass lying flat upon the top surface of the blade and the upper carcass trailing the lower carcass positioned below the blade, and severing the lower carcass from the upper carcass as the whole poultry carcass is moved between the progressively narrowing cutting edges;

continuing the movement of the lower carcass portion on the overhead conveyor;

continuing the movement of the upper carcass along a path approximately parallel to the path of the overhead conveyor, after the separation of the upper and lower carcasses; and cutting through the upper carcass as the upper carcass moves along its path with cuts extending approximately parallel to the backbone of the carcass.

2. A method for the on-line processing of the breast and back portions of a poultry carcass or the like comprising the steps of:

suspending a plurality of previously eviscerated poultry carcasses with the legs of each carcass hanging from an overhead conveyor and with the visceral opening of each carcass facing upwardly and the neck opening of each carcass facing downwardly;

moving each carcass with the conveyor along a processing path;

as each carcass moves along the processing line separating the upper carcass portion including the breast and upper back from the lower carcass portion including the lower back;

continuing the movement of the lower carcass portion on the overhead conveyor;

continuing the movement of the upper cacass portion along a path approximately parallel to the path of the overhead conveyor, after the separation of the upper and lower carcasses by circumscribing the visceral cavity of the upper carcass about an internal guide rail with the internal guide rail extending through the visceral opening of the upper carcass with the back on top of the internal guide rail facing upwardly and the breast below the internal guide rail facing downwardly;

engaging the sides of the breast with a pair of chain conveyors on opposite sides of the internal guide rail;

pulling the breast forward along the internal guide rail with the movement of the chain conveyors, and cutting through the upper carcass as the upper carcass moves along its path with cuts extending approximately parallel to the backbone of the carcass.

3. A method for the on-line processing of the breast and back portions of a poultry carcass or the like, comprising the steps of:

suspending a plurality of previously eviscerated poultry carcasses with the legs of each carcass hanging from an overhead conveyor and with the visceral opening of the carcass facing upwardly and the neck opening of the carcass facing downwardly;

moving the carcass with the conveyor along a processing path;

separating the upper carcass portion from the lower carcass portion of the poultry carcass;

continuing the movement of the lower carcass portion on the overhead conveyor;

continuing the movement of the upper carcass along a path approximately parallel to the path of the overhead conveyor after the separation of the upper and lower carcasses;

contacting the breast and back with a positioning means comprising passing the breast and back between a pair of elongated positioning members aligned above and below the guide rail;

forcing the back downwardly onto the top of the internal guide rail as the back is contacted by the upper positioning member; and forcing the breast upward against the internal guide rail to flatten out the carcass for cutting; and cutting through the upper carcass as the upper carcass moves along its path with cuts extending approximately parallel to the backbone of the carcass.

4. A method for the on-line processing of the breast and back portions of a poultry carcass or the like comprising the steps of:

suspending a plurality of previously eviscerated poultry carcasses with the legs of each carcass hanging from an overhead conveyor and with the visceral opening of the carcass facing upwardly and the neck opening of the carcass facing downwardly;

moving the carcass with the conveyor along a processing path;

separating the upper carcass portion from the lower carcass portion of the poultry carcass;

continuing the movement of the lower carcass portion on the overhead conveyor;

continuing the movement of the upper carcass along a path approximately parallel to the path of the overhead conveyor after the separation of the upper and lower carcasses; and cutting through the upper carcass as the upper carcass moves along its path with cuts extending approximately parallel to the backbone of the carcass by the steps of:

raising a rotary halving blade to a full cutting position extending partially through the internal guide rail;

lifting back removal blades upward away from the internal guide rail out of cutting position; and cutting through the breast and backbone of the carcass to completely separate the carcass into two sections.

5. An apparatus for the previously halving of the breast and upper back of eviscerated birds and the removal of the upper backbone of the birds as the breast and upper back are separated from the saddle of the birds hanging by their legs and thighs from an overhead conveyor system comprising:

an adjustable frame;

a stationary blade attached to said frame for separating the upper back and breast from the lower back, legs and thighs of a bird.

a support member channel below said stationary blade for supporting the breast and upper back of a bird during separation from the lower back legs and thighs of the bird.

an internal guide rail mounted within said frame adjacent to said support channel for supporting and aligning the breast and upper back of the bird during processing;

a pair of conveyors mounted on opposite sides of said internal guide rail for pulling the breast and upper back of a bird along said internal guide rail;

a rotary halving blade adjacent to said lower positioning means below said internal guide rail and extendable through said internal guide rail for separating the breast into sections; and a pair of rotary back removal blades following said rotary halving blade above said internal guide rail for cutting the backbone out of the back of the bird.

6. The apparatus for the halving of the breasts and upper backs of birds as recited in claim 5, wherein said stationary blade comprises a V-shaped plate having opposing cutting surfaces which progressively narrow from a widely spaced position toward each other forming cutting edges for separating the breast and upper back from the lower back, legs and thighs of the bird, and saw teeth portions along the length of each of said cutting edges for cutting the skin of the bird as the back and breast are separated from the legs and thighs of the bird.

7. The apparatus for the on-line halving and processing of the breasts and backs of birds as recited in claim 5 wherein said internal guide rail for supporting and aligning the breast and back of the bird during processing comprises an arched longitudinal member having an input end for receiving the bird with the back of the bird above said longitudinal member and the breast of the bird below said longitudinal member, and a discharge end for the removal of the processed bird.

8. The apparatus for on-line halving and processing of the breasts and backs of birds as recited in claim 5, wherein said upper positioning means above said internal guide rail comprises an inverted V-shaped bar mounted for engaging the back of a bird mounted on said internal guide rail, a hinge along the length of said V-shaped bar for tilting said V-shaped bar toward and away from the back of a bird on said internal guide rail, and a compression means attached to said V-shaped bar at a position behind said hinge for pressing said V-shaped bar downwardly into contact with the back of the bird, forcing the back into proper cutting position on said internal guide rail.

9. The apparatus for on-line halving and processing of the breasts and backs of birds as recited in claim 5 wherein said lower positioning means below said internal guide rail comprises a V-shaped bar extending upwardly at an angle toward said internal guide rail for ensuring the breast is guided onto said internal guide rail, and a compression means linking said V-shaped bar to said frame for forcing said V-shaped bar upward into contact with the breast of the bird to flatten the breast against said internal guide rail for cleaner cutting by said halving blade.

10. An apparatus for halving and processing the breasts and backs of poultry carcasses having breast and back portions, legs, thighs and a backbone, hanging from a processing line overhead, comprising;

a vertically adjustable frame;

a V-shaped separator blade for separating the breast and the back of the carcass from the legs and thighs of the carcass;

a support means below said separator blade for aligning and supporting the breast and back in a horizontal cutting position during separation from the legs and thighs of the carcass;

an arched internal guide rail following said support means having an input end and a discharge end for receiving and supporting the carcass with its back on top of said internal guide rail and breast hanging below said internal guide rail during processing;

a pair of conveyors affixed to said frame on opposite sides of said internal guide rail to engage the carcass for pulling the carcass along said internal guide rail during processing;

a rotary halving blade mounted below said internal guide rail and movable upwardly through said internal guide rail to separate the breast and back of the carcass into two sections as the carcass is pulled along said internal guide rail;

a pair of V-shaped positioning members mounted above and below said internal guide rail for aligning the back and breast of the bird in proper position on said internal guide rail for cutting by said rotary halving blades; and a pair of rotary back removal blades immediately proceeding said discharge end of said internal guide rail for engaging the back of the carcass to remove the backbone from the back of the carcass.

11. The apparatus for halving and processing the breasts and backs poultry carcasses as recited in claim 10 wherein said adjustable frame includes a hoist means at the top of said frame and a crank connected to said hoist means for raising and lowering said frame with respect to the height of the poultry carcass passing overhead on the processing line.

12. The apparatus for halving and processing the breasts and backs of poultry carcasses as recited in claim 10 wherein said rotary halving blade is movable from a lowered initial position out of engagement with the breast or back of a carcass on said internal guide rail upward into an intermediate cutting position immediately below said internal guide rail for engaging and splitting the breast of the carcass on said internal guide rail, and further upward into a final cutting position extending through said internal guide rail for engaging and splitting the breast, back and backbone of the carcass on said internal guide rail.

13. The apparatus for halving and processing the breasts and backs of poultry carcasses as recited in claim 12 wherein said pair of rotary back removal blades are tilted from a raised position out of engagement with the back of the carcass when said rotary halving blade is in said fully raised final cutting position splitting the breast, back and backbone of the carcass on said internal guide rail, downward into a lowered cutting position when said rotary halving blade is in said intermediate cutting position, splitting only the breast of the carcass on said internal guide rail or when said rotary halving blade is in said initial position out of engagement with the carcass, for engaging the back of the carcass on said internal guide rail on opposite sides of the backbone of the carcass to remove the backbone from the carcass.

14. The apparatus for halving and processing the breasts and backs of poultry carcasses as recited in claim 10 and further comprising a triangular clearing member mounted to said internal guide rail below said discharge end of said internal guide rail for urging the breast of a carcass away from its backbone which is being removed by said back removal blades, and for ensuring the separation of the skin between the sections of the breast separated by said rotary halving blade.

15. A method of on-line removing the breast and back portions from the legs and thighs of a poultry carcass and separately processing the breast and back portions, comprising the steps of:

suspending each carcass by its legs from a shackle of an overhead conveyor;

moving each carcass on its shackle with its breast leading its back toward a cutting station;

partially supporting the carcass along its thighs to tilt the visceral cavity so as to face in the direction of movement;

cutting at the cutting station the visceral cavity between the breast and the thighs and through the backbone of the carcass to separate the saddle portion from the breast, back and upper back portions of the carcass;

circumscribing the visceral cavity about an internal guide rail; and as the carcass moves along the internal guide rail selectively cutting longitudinally through the breast and backbone portions of the carcass.

16. The method of claim 15 and further comprising the step of trailing the thighs of the carcass along a surface so as to tilt the legs rearwardly from the overhead conveyor and to partially support the carcasses at their thighs, whereby the breast and its adjacent backbone are tilted and positioned at a predetermined elevation for further processing.

17. The method of claim 16 and further comprising the step of cutting through the backbone of the carcass between the breast and the saddle as the breast and back bone are tilted.

18. The method of claim 16 and further comprising mounting the visceral cavity of the carcass on a internal guide rail as the breast and back bone are tilted.

19. The method of claim 15 and further comprising the steps of contacting the breast prior to engagement with the cutting station to support the breast and back of the carcass during cutting, and tilting the breast and back to align the visceral cavity of the carcass with the internal guide rail.

* * * * *